United States Patent
Deng et al.

(10) Patent No.: US 10,941,260 B2
(45) Date of Patent: Mar. 9, 2021

(54) PLASTICIZED BIODEGRADABLE POLYESTER FILM AND PREPARATION METHOD THEREOF

(71) Applicant: Guangzhou Hairma Chemical (GZ) Ltd., Guangzhou (CN)

(72) Inventors: Jianneng Deng, Guangzhou (CN); Bianying Wen, Guangzhou (CN); Fanwen Yang, Guangzhou (CN); Jian He, Guangzhou (CN); Tingting Wu, Guangzhou (CN)

(73) Assignee: Guangzhou Hairma Chemical (GZ) Ltd., Guangzhou (CN)

( * ) Notice: Subject to any disclaimer, the term of this patent is extended or adjusted under 35 U.S.C. 154(b) by 357 days.

(21) Appl. No.: 15/776,233

(22) PCT Filed: Dec. 29, 2016

(86) PCT No.: PCT/CN2016/112864
§ 371 (c)(1),
(2) Date: May 15, 2018

(87) PCT Pub. No.: WO2017/121242
PCT Pub. Date: Jul. 20, 2017

(65) Prior Publication Data
US 2020/0255606 A1    Aug. 13, 2020

(30) Foreign Application Priority Data

Jan. 13, 2016  (CN) .......................... 201610021447.6

(51) Int. Cl.
| | |
|---|---|
| *C08J 5/18* | (2006.01) |
| *C08K 5/101* | (2006.01) |
| *C08K 3/34* | (2006.01) |
| *C08K 3/105* | (2018.01) |
| *C08K 3/22* | (2006.01) |
| *C08K 5/13* | (2006.01) |
| *C08K 5/524* | (2006.01) |
| *C08K 5/526* | (2006.01) |
| *C08K 3/26* | (2006.01) |
| *C08L 67/04* | (2006.01) |
| *C08L 67/02* | (2006.01) |

(52) U.S. Cl.
CPC ................ *C08J 5/18* (2013.01); *C08K 3/105* (2018.01); *C08K 3/22* (2013.01); *C08K 3/26* (2013.01); *C08K 3/346* (2013.01); *C08K 5/101* (2013.01); *C08K 5/13* (2013.01); *C08K 5/524* (2013.01); *C08K 5/526* (2013.01); *C08L 67/02* (2013.01); *C08L 67/04* (2013.01); *C08J 2367/03* (2013.01); *C08J 2367/04* (2013.01); *C08J 2467/04* (2013.01); *C08K 2003/2241* (2013.01); *C08K 2003/265* (2013.01); *C08L 2201/06* (2013.01); *C08L 2203/16* (2013.01); *C08L 2205/02* (2013.01); *C08L 2205/08* (2013.01)

(58) Field of Classification Search
CPC ...... C08J 5/18; C08J 2467/04; C08J 2367/04; C08K 3/346; C08K 3/105; C08K 3/22; C08K 5/13; C08K 5/524; C08K 5/526; C08K 3/26; C08K 2003/265; C08K 5/101; C08L 67/02; C08L 2205/08; C08L 2205/02; C08L 2203/16; C08L 2201/06
See application file for complete search history.

(56) References Cited

FOREIGN PATENT DOCUMENTS

| | | |
|---|---|---|
| CN | 102250454 A | 11/2011 |
| CN | 102285946 | * 11/2011 |
| CN | 102285946 A | 12/2011 |
| CN | 103232689 | * 8/2013 |
| CN | 103232689 A | 8/2013 |
| CN | 103703077 A | 4/2014 |
| CN | 103937179 A | 7/2014 |
| CN | 105623214 A | 6/2016 |

OTHER PUBLICATIONS

International Search Report and Written Opinion from PCT/CN2016/112864 dated Mar. 21, 2017.

* cited by examiner

*Primary Examiner* — Robert D Harlan
(74) *Attorney, Agent, or Firm* — Troutman Pepper Hamilton Sanders LLP; Ryan A. Schneider

(57) ABSTRACT

A plasticized biodegradable polyester film formed from a biodegradable polyester in approximately 100 parts by weight, a plasticizer in from approximately 5-25 parts by weight, an inorganic filler in from approximately 0-150 parts by weight; and an antioxidant in from approximately 0.1-1 parts by weight. A method for preparing the plasticized biodegradable polyester film including drying the biodegradable polyester, drying the inorganic filler, mixing the biodegradable polyester, the plasticizer, the inorganic filler and the antioxidant, adding the mixed biodegradable polyester, plasticizer, inorganic filler and antioxidant into an extruder forming extruded plasticized biodegradable polyester material, drying the extruded plasticized biodegradable polyester material, and blowing the dried plasticized biodegradable polyester material as a master batch into film through a extruder to obtain the plasticized biodegradable polyester film.

20 Claims, No Drawings

PLASTICIZED BIODEGRADABLE POLYESTER FILM AND PREPARATION METHOD THEREOF

BACKGROUND OF THE INVENTION

1. Field of the Invention

The present invention relates to a plastic film product, in particular to a biodegradable plasticized polyester film. In addition, the present invention also relates to a method for preparing the plasticized biodegradable polyester film. Which fall into the field of polymer materials.

2. Description of Related Art

In recent years, along with the rapid development of society and economy, the extensive use of polymer materials, especially plastic films, has brought great convenience to the people's lives. Traditional plastic film materials mainly come from petroleum, such as polyethylene, polypropylene, etc. These plastic films also bring a series of environmental and energy problems during the use. The existence of a large amount of plastic waste seriously affects the people's health and the living environment; for example, some agricultural lands begin to reduce production because of abandoned plastic film; the "white pollution" caused by waste plastics causes serious damage to the environment. Therefore, with the ever-decreasing of the non-renewable petroleum resources and the people's high attention to environmental issues, the development of a completely biodegradable plastic film material has become a research hotspot in the society.

Polylactide (PLA), polybutylene succinate (PBS), poly (butylene terephthalate-co-adipate-butylene glycol) copolyester (PBAT), (PHA) and so on all fall into biodegradable polyester materials; after use, these materials can be completely degraded by microorganisms in the natural world, eventually breaking down into $CO_2$ and $H_2O$, which do not pollute the environment and are recognized as environmentally friendly materials. At the same time, most of the raw materials for preparing these biodegradable materials are plant-based. Therefore, promoting the use of this type of materials not only saves precious petroleum resources, but also brings no negative impact on the environment after the materials are used; the market prospect is broad.

Among these biodegradable polyester materials, PLA has a wide range of sources, low cost, good mechanical properties and physical properties; in addition, PLA products have good gloss and transparency; the property is comparable to that of a film made of polystyrene, which is unmatched by other biodegradable products; PLA is also the only biodegradable plastic with excellent antibacterial and antifungal properties. However, PLA is hard and brittle, poor in flexibility and not heat-resistant; it is difficult to process and cannot be directly made into a film, which limit its application range. Therefore, if PLA is used as raw material to prepare biodegradable polyester film, it is necessary to increase the toughness of PLA, so that it can have a broader market prospect. At present, there are two commonly used technologies for PLA toughening modification: one is to add a certain type and amount of plasticizer to improve toughness of PLA; the other is to blend PLA with other flexible biodegradable material, to make blended degradable material. However, due to the compatibility of plasticizer and other biodegradable material with PLA, when the amount added to PLA is too large, both may be separated from the material, thereby reducing the property of PLA product. Therefore, in the preparation of biodegradable polyester film using PLA as raw material, it is necessary to add a compatibilizer with excellent properties.

PBAT is a ternary copolyester polymerized from terephthalic acid, adipic acid and 1,4-butanediol; its structure contains a flexible aliphatic chain and a rigid aromatic bond, which gives it high toughness and high temperature resistance, capable of being directly made into thin film material; the existence of aliphatic ester bond makes it have biodegradability; it is commonly blended with PLA to improve toughness and elongation at break of PLA. However, PBAT is synthesized from petroleum products, in addition, compared with traditional polypropylene and polyethylene materials, PBAT has a higher selling price, which makes the prepared film less competitive than traditional materials. To slow down the consumption rate of petroleum resources and reduce the cost of PBAT materials, it is usually achieved by adding inexpensive inorganic fillers during the PBAT modification process. However, if the proportion of the added inorganic filler is too large, the property of the PBAT product will be degraded, which affects the flexibility and film formation. Therefore, it is necessary to add a plasticizer having a good plasticizing property to ensure the mechanical properties of its product.

SUMMARY OF THE INVENTION

A purpose of the present invention is to overcome the deficiency in the prior art and to provide a completely biodegradable polyester film which is good in plasticization and mechanical property and has certain toughness and strength, capable of meeting the people's daily life requirements. Another object of the present invention is to provide a method for preparing the biodegradable polyester film.

In an exemplary embodiment of the present invention, a plasticized biodegradable polyester film is presented comprising a biodegradable polyester in approximately 100 parts by weight; a plasticizer in from approximately 5-25 parts by weight; an inorganic filler in from approximately 0-150 parts by weight; and an antioxidant in from approximately 0.1-1 parts by weight.

The biodegradable polyester can be selected from the group consisting of polylactic acid and poly(butylene terephthalate-co-butylene adipate) ester.

The biodegradable polyester can comprise a polylactic acid that has a weight average molecular weight Mw of from approximately 100,000 to 400,000. The biodegradable polyester can comprise poly(butylene terephthalate-co-butylene adipate) ester having a weight average molecular weight Mw of from approximately 50,000 to 80,000.

The plasticizer can be diacetyl epoxy vegetable glyceryl oleate.

The inorganic filler can comprise at least one filler selected from the group consisting of calcium carbonate, kaolin, talcum powder, titanium dioxide, mica and montmorillonite.

The antioxidant can be selected from the group consisting of pentaerythritol tetrakis [β-(3,5-di-tert-butyl-4-hydroxyphenyl) propionate] ester, β-(3,5-di-tert-butyl-4-hydroxyphenyl)propionic acid n-octadecyl ester, antioxidant BHT, tris[2,4-di-t-butylphenyl] phosphite, bis(2,4-di-tert-butylphenol) pentaerythritol diphosphite, and triphenyl phosphite.

In another exemplary embodiment of the present invention, a method for preparing the plasticized biodegradable polyester film noted above can comprise: drying the biodegradable polyester; drying the inorganic filler; mixing the biodegradable polyester, the plasticizer, the inorganic filler and the antioxidant; adding the mixed biodegradable polyester, plasticizer, inorganic filler and antioxidant into an extruder forming extruded plasticized biodegradable polyester material; drying the extruded plasticized biodegradable polyester material; and blowing the dried plasticized biodegradable polyester material as a master batch into film through a extruder to obtain the plasticized biodegradable polyester film.

Drying the biodegradable polyester can comprise drying the biodegradable polyester in a vacuum at from approximately 70-90° C. for from approximately 8-24 hours.

Mixing the biodegradable polyester, plasticizer, inorganic filler and antioxidant can comprise mixing the biodegradable polyester, plasticizer, inorganic filler and antioxidant at from approximately 200-250 rpm for from approximately 5-15 minutes.

Adding the mixed biodegradable polyester, plasticizer, inorganic filler and antioxidant into an extruder can comprise adding the mixed biodegradable polyester, plasticizer, inorganic filler and antioxidant into a twin-screw extruder.

The method can further comprise melt-blending the plasticized biodegradable polyester material via a twin-screw extruder.

The method can further comprise strip-drawing and grain-slicing a twin-screw extruded plasticized biodegradable polyester material.

Drying the extruded plasticized biodegradable polyester material can comprise drying the extruded plasticized biodegradable polyester material in a vacuum at from approximately 70-90° C. for from approximately 8-24 hours.

Blowing the dried plasticized biodegradable polyester material can comprise blowing the dried plasticized biodegradable polyester material as a master batch into film through a single-screw extruder.

Drying the inorganic filler can comprises drying the inorganic filler in a vacuum at from approximately 105-125° C. for from approximately 3-12 hours.

To achieve the above objects, in another exemplary embodiment of the present invention, it adopts the following more specific technical solutions:

A plasticized biodegradable polyester film is made from the following components in parts by weight: biodegradable polyester: 100 parts, plasticizer: 5-25 parts, inorganic filler: 0-150 parts, antioxidant: 0.1-1 parts.

Preferably, the biodegradable polyester is polylactic acid and/or poly(butylene terephthalate-co-butylene adipate) ester;

More preferably, the polylactic acid has a weight average molecular weight Mw of 100,000 to 400,000; and the poly(butylene terephthalate-co-butylene adipate) ester has a density of 1.18 to 1.30 g/cm$^3$, a weight average molecular weight Mw of 50,000-80,000, and a melting point of 100-130° C.;

Preferably, the plasticizer is diacetyl epoxy vegetable glyceryl oleate;

Preferably, the inorganic filler is at least one of calcium carbonate, kaolin, talcum powder, titanium dioxide, mica, and montmorillonite;

Preferably, the antioxidant is one of pentaerythritol tetrakis [β-(3,5-di-tert-butyl-4-hydroxyphenyl) propionate] ester (antioxidant 1010), β-(3,5-di-tert-butyl-4-hydroxyphenyl) propionic acid n-octadecyl ester (antioxidant 1076), antioxidant BHT, tris[2,4-di-t-butylphenyl] phosphite (antioxidant 168), bis(2,4-di-tert-butylphenol) pentaerythritol diphosphite (antioxidant 626), and triphenyl phosphite.

Another object of the present invention is a method for preparing a plasticized biodegradable polyester film as described above, which includes the following preparation steps:

1) drying the biodegradable polyester and the inorganic filler;

2) rapidly mixing the biodegradable polyester, the plasticizer, the inorganic filler and the antioxidant according to the above parts by weight at room temperature at a rotation speed of 200-250 rpm for 5-15 minutes;

3) adding the raw material mixed evenly in step 2) into a twin-screw extruder for melt-blending, then obtaining the plasticized biodegradable polyester material after strip-drawing and grain-slicing;

4) drying the plasticized biodegradable polyester material obtained in step 3) in vacuum at 70-90° C. for 8-24 hours;

5) blowing the plasticized biodegradable polyester material after drying in step 4) as a master batch into film, then obtaining the plasticized biodegradable polyester film sequentially after melting, plasticization, pressurization, cooling, traction and rolling.

Preferably, in the step 1), the step of drying the biodegradable polyester is: drying the biodegradable polyester material in vacuum at 70-90° C. for 8-24 hours; the drying process of the inorganic filler is: drying the inorganic filler in vacuum at 105-125° for 3-12 hours.

Preferably, in the step 3), the twin-screw extruder is a co-rotating twin-screw extruder or a counter-rotating twin-screw extruder; moreover, the operating temperature of the twin-screw extruder is 130-180° C., and the rotation speed of screw is 100-220 rpm;

Preferably, in step 5), the operating temperature of the single-screw extruder is 130-180° C. and the rotation speed of screw is 200-400 rpm.

Diacetyl epoxy vegetable glyceryl oleate is a new type of environment-friendly and biodegradable plasticizer synthesized from vegetable oil and glycerin as raw material through the steps of transesterification, acetylation and epoxidation. The relative molecular weight of the diacetyl epoxy vegetable glyceryl oleate plasticizer is approximately 450, which falls into plasticizers of higher molecular weight; compared to other phthalic plasticizers such as DOP, DOA, and DOTP, it has better resistance to precipitation and migration; in addition, it has good plasticizing properties; when applied to PLA, it can significantly increase the elongation at break and ensure a certain tensile strength; when applied to PBAT materials added with inorganic fillers, it can reduce the production costs while ensuring the mechanical properties. In addition, when diacetyl epoxy vegetable glyceryl oleate is added as a compatibilizer to the mixed material of PLA and PBAT, due to the existence of polar propertyal group epoxy bonds in the structure, it can react with reactive groups in PLA and PBAT such as terminal hydroxyl groups and terminal carboxyl groups at normal processing temperatures, such that the compatibility of the two is improved and the purpose of improving the processing property and mechanical properties of the products is achieved. Moreover, diacetyl epoxy vegetable glyceryl oleate has good lubricity and can be used as lubricant.

The present invention, through adding a new environmentally friendly and biodegradable plasticizer (diacetyl epoxy vegetable glyceryl oleate) to PLA and/or PBAT, plasticizes and expands the biodegradable polyester material and increases the plasticization property and mechanical properties of biopolyester, which gives it a certain toughness and strength; moreover, the prepared polyester film is completely biodegradable. In addition, through addition of a certain amount of inorganic filler, under the precondition of not affecting the mechanical property of the film product, the production cost of the product can be significantly reduced, and the market competitiveness can be improved.

DETAIL DESCRIPTION OF THE INVENTION

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways.

As used in the specification and the appended Claims, the singular forms "a," "an" and "the" include plural references unless the context clearly dictates otherwise. For example, reference to a component is intended also to include a composition of a plurality of components. References to a composition containing "a" constituent is intended to include other constituents in addition to the one named.

In describing exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed as from "about" or "approximately" or "substantially" one value and/or to "about" or "approximately" or "substantially" another value. When such a range is expressed, other exemplary embodiments include from the one value and/or to the other value.

Similarly, as used herein, "substantially free" of something, or "substantially pure", and like characterizations, can include both being "at least substantially free" of something, or "at least substantially pure", and being "completely free" of something, or "completely pure".

"Comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The characteristics described as defining the various elements of the invention are intended to be illustrative and not restrictive. For example, if the characteristic is a material, the material includes many suitable materials that would perform the same or a similar function as the material(s) described herein are intended to be embraced within the scope of the invention. Such other materials not described herein can include, but are not limited to, for example, materials that are developed after the time of the development of the invention.

The following specific examples further describe the specific embodiments of the present invention. However, the present invention is not limited to the following examples. Unless otherwise specified, each raw material used in the present invention can be obtained by purchase from the market. Among them, PLA has a weight average molecular weight Mw of 100,000 to 400,000; a PBAT has a density of 1.18 to 1.30 g/cm$^3$, a weight average molecular weight Mw of 50,000 to 80,000, and a melting point of 100 to 130° C.; diacetyl epoxy vegetable glyceryl oleate is a biodegradable plasticizer (CN102285946B) produced by Guangzhou Hairma Grease Oil Co Ltd., which can also be used as compatibilizer and lubricant.

Example 1

A plasticized biodegradable polyester film, which is made from the following components in parts by weight: PLA: 100 parts, diacetyl epoxy vegetable glyceryl oleate: 10 parts, antioxidant 1010:0.1 part; its preparation steps include:
  1) drying PLA in a vacuum oven at 70° C. for 24 hours;
  2) adding PLA, diacetyl epoxy vegetable glyceryl oleate, and antioxidant 1010 of the above-mentioned parts by weight to a high-speed mixer, rapidly mixing the same at room temperature at a rotation speed of 250 rpm for 5 mins;
  3) adding the raw material mixed evenly in the step 2) to a twin-screw extruder for melt-blending, the operation temperature of the twin-screw extruder in each temperature zone being of 130-180° C., the rotation speed of screw being 100 rpm, then obtaining the plasticized biodegradable polyester material after strip-drawing and grain-slicing;
  4) drying the plasticized biodegradable polyester material obtained in step 3) in a vacuum oven at 70° C. for 24 hours;
  5) blowing the plasticized biodegradable polyester material obtained after drying in step 4) as a master batch into film through a single-screw extruder, the operating temperature of the film blowing machine in each temperature zone being 130-180° C., the rotation speed of screw being 300 rpm, then obtaining the plasticized biodegradable polyester film sequentially after melting, plasticization, pressurization, cooling, traction and rolling.

Example 2

A plasticized biodegradable polyester film, which is made from the following components in parts by weight: PLA: 100 parts, diacetyl epoxy vegetable glyceryl oleate: 20 parts, antioxidant 1010:0.5 parts; its preparation steps include:
  1) drying PLA in a vacuum oven at 90° C. for 9 hours;
  2) adding PLA, diacetyl epoxy vegetable glyceryl oleate, and antioxidant 1010 of the above-mentioned parts by weight to a high-speed mixer, rapidly mixing the same at room temperature at a rotation speed of 230 rpm for 6 mins;
  3) adding the raw material mixed evenly in the step 2) to a twin-screw extruder for melt-blending, the operation temperature of the twin-screw extruder in each temperature zone being of 130-180° C., the rotation speed of screw being 120 rpm, then obtaining the plasticized biodegradable polyester material after strip-drawing and grain-slicing;
  4) drying the plasticized biodegradable polyester material obtained in step 3) in a vacuum oven at 90° C. for 9 hours;
  5) blowing the plasticized biodegradable polyester material obtained after drying in step 4) as a master batch into film through a single-screw extruder, the operating temperature of the film blowing machine in each temperature zone being 130-180° C., the rotation speed of screw being 200 rpm, then obtaining the plasticized biodegradable polyester film sequentially after melting, plasticization, pressurization, cooling, traction and rolling.

Example 3

A plasticized biodegradable polyester film, which is made from the following components in parts by weight: PBAT:

100 parts, diacetyl epoxy vegetable glyceryl oleate: 8 parts, calcium carbonate: 120 parts, antioxidant 1076:0.4 parts; its preparation steps include:

1) drying PBAT in a vacuum oven at 75° C. for 22 hours; drying calcium carbonate in a vacuum oven at 110° C. for 10 hours;

2) adding PBAT, diacetyl epoxy vegetable glyceryl oleate, calcium carbonate and antioxidant 1076 of the above-mentioned parts by weight to a high-speed mixer, rapidly mixing the same at room temperature at a rotation speed of 210 rpm for 8 mins;

3) adding the raw material mixed evenly in the step 2) to a twin-screw extruder for melt-blending, the operation temperature of the twin-screw extruder in each temperature zone being of 130-180° C., the rotation speed of screw being 200 rpm, then obtaining the plasticized biodegradable polyester material after strip-drawing and grain-slicing;

4) drying the plasticized biodegradable polyester material obtained in step 3) in a vacuum oven at 75° C. for 22 hours;

5) blowing the plasticized biodegradable polyester material obtained after drying in step 4) as a master batch into film through a single-screw extruder, the operating temperature of the film blowing machine in each temperature zone being 130-180° C., the rotation speed of screw being 250 rpm, then obtaining the plasticized biodegradable polyester film sequentially after melting, plasticization, pressurization, cooling, traction and rolling.

Example 4

A plasticized biodegradable polyester film, which is made from the following components in parts by weight: PBAT: 100 parts, diacetyl epoxy vegetable glyceryl oleate: 15 parts, kaolin: 120 parts, antioxidant BHT: 0.5 Parts; its preparation steps include:

1) drying PBAT in a vacuum oven at 78° C. for 20 hours; drying kaolin in a vacuum oven at 115° C. for 8 hours;

2) adding PBAT, diacetyl epoxy vegetable glyceryl oleate, kaolin and antioxidant BHT of the above-mentioned parts by weight to a high-speed mixer, rapidly mixing the same at room temperature at a rotation speed of 220 rpm for 7.5 mins;

3) adding the raw material mixed evenly in the step 2) to a twin-screw extruder for melt-blending, the operation temperature of the twin-screw extruder in each temperature zone being of 130-180° C., the rotation speed of screw being 180 rpm, then obtaining the plasticized biodegradable polyester material after strip-drawing and grain-slicing;

4) drying the plasticized biodegradable polyester material obtained in step 3) in a vacuum oven at 78° C. for 20 hours;

5) blowing the plasticized biodegradable polyester material obtained after drying in step 4) as a master batch into film through a single-screw extruder, the operating temperature of the film blowing machine in each temperature zone being 130-180° C., the rotation speed of screw being 285 rpm, then obtaining the plasticized biodegradable polyester film sequentially after melting, plasticization, pressurization, cooling, traction and rolling.

Example 5

A plasticized biodegradable polyester film, which is made from the following components in parts by weight: PBAT: 100 parts, diacetyl epoxy vegetable glyceryl oleate: 25 parts, talcum powder: 120 parts, antioxidant 168:0.6 parts; its preparation steps include:

1) drying PBAT in a vacuum oven at 80° C. for 12 hours; drying talcum powder in a vacuum oven at 120° C. for 5 hours;

2) adding PBAT, diacetyl epoxy vegetable glyceryl oleate, talcum powder and antioxidant 168 of the above-mentioned parts by weight to a high-speed mixer, rapidly mixing the same at room temperature at a rotation speed of 230 rpm for 8 mins;

3) adding the raw material mixed evenly in the step 2) to a twin-screw extruder for melt-blending, the operation temperature of the twin-screw extruder in each temperature zone being of 130-180° C., the rotation speed of screw being 220 rpm, then obtaining the plasticized biodegradable polyester material after strip-drawing and grain-slicing;

4) drying the plasticized biodegradable polyester material obtained in step 3) in a vacuum oven at 80° C. for 12 hours;

5) blowing the plasticized biodegradable polyester material obtained after drying in step 4) as a master batch into film through a single-screw extruder, the operating temperature of the film blowing machine in each temperature zone being 130-180° C., the rotation speed of screw being 320 rpm, then obtaining the plasticized biodegradable polyester film sequentially after melting, plasticization, pressurization, cooling, traction and rolling.

Example 6

A plasticized biodegradable polyester film, which is made from the following components in parts by weight: PBAT: 100, diacetyl epoxy vegetable glyceryl oleate: 18 parts, mica: 50 parts, antioxidant 626:0.8 parts; its preparation steps include:

1) drying PBAT in a vacuum oven at 82° C. for 11 hours; drying mica in a vacuum oven at 125° C. for 3.5 hours;

2) adding PBAT, diacetyl epoxy vegetable glyceryl oleate, mica and antioxidant 626 of the above-mentioned parts by weight to a high-speed mixer, rapidly mixing the same at room temperature at a rotation speed of 210 rpm for 10 mins;

3) adding the raw material mixed evenly in the step 2) to a twin-screw extruder for melt-blending, the operation temperature of the twin-screw extruder in each temperature zone being of 130-180° C., the rotation speed of screw being 200 rpm, then obtaining the plasticized biodegradable polyester material after strip-drawing and grain-slicing;

4) drying the plasticized biodegradable polyester material obtained in step 3) in a vacuum oven at 82° C. for 11 hours;

5) blowing the plasticized biodegradable polyester material obtained after drying in step 4) as a master batch into film through a single-screw extruder, the operating temperature of the film blowing machine in each temperature zone being 130-180° C., the rotation speed of screw being 380 rpm, then obtaining the plasticized biodegradable polyester film sequentially after melting, plasticization, pressurization, cooling, traction and rolling.

Example 7

A plasticized biodegradable polyester film, which is made from the following components in parts by weight: PBAT: 100 parts, diacetyl epoxy vegetable glyceryl oleate: 18 parts, titanium dioxide: 100 parts, triphenyl phosphite: 0.7 parts; its preparation steps include:

1) drying PBAT in a vacuum oven at 85° C. for 10 hours; drying titanium dioxide in a vacuum oven at 120° C. for 5 hours;

2) adding PBAT, diacetyl epoxy vegetable glyceryl oleate, titanium dioxide and triphenyl phosphite of the above-mentioned parts by weight to a high-speed mixer, rapidly mixing the same at room temperature at a rotation speed of 200 rpm for 12 mins;

3) adding the raw material mixed evenly in the step 2) to a twin-screw extruder for melt-blending, the operation temperature of the twin-screw extruder in each temperature zone being of 130-180° C., the rotation speed of screw being 220 rpm, then obtaining the plasticized biodegradable polyester material after strip-drawing and grain-slicing;

4) drying the plasticized biodegradable polyester material obtained in step 3) in a vacuum oven at 85° C. for 10 hours;

5) blowing the plasticized biodegradable polyester material obtained after drying in step 4) as a master batch into film through a single-screw extruder, the operating temperature of the film blowing machine in each temperature zone being 130-180° C., the rotation speed of screw being 400 rpm, then obtaining the plasticized biodegradable polyester film sequentially after melting, plasticization, pressurization, cooling, traction and rolling.

Example 8

A plasticized biodegradable polyester film, which is made from the following components in parts by weight: PBAT: 100 parts, diacetyl epoxy vegetable glyceryl oleate: 18 parts, montmorillonite: 150 parts, antioxidant BHT: 0.9 parts; its preparation steps include:

1) drying PBAT in a vacuum oven at 88° C. for 9 hours; drying montmorillonite in a vacuum oven at 110° C. for 10 hours;

2) adding PBAT, diacetyl epoxy vegetable glyceryl oleate, montmorillonite and antioxidant BHT of the above-mentioned parts by weight to a high-speed mixer, rapidly mixing the same at room temperature at a rotation speed of 240 rpm for 15 mins;

3) adding the raw material mixed evenly in the step 2) to a twin-screw extruder for melt-blending, the operation temperature of the twin-screw extruder in each temperature zone being of 130-180° C., the rotation speed of screw being 130 rpm, then obtaining the plasticized biodegradable polyester material after strip-drawing and grain-slicing;

4) drying the plasticized biodegradable polyester material obtained in step 3) in a vacuum oven at 88° C. for 9 hours;

5) blowing the plasticized biodegradable polyester material obtained after drying in step 4) as a master batch into film through a single-screw extruder, the operating temperature of the film blowing machine in each temperature zone being 130-180° C., the rotation speed of screw being 260 rpm, then obtaining the plasticized biodegradable polyester film sequentially after melting, plasticization, pressurization, cooling, traction and rolling.

Example 9

A plasticized biodegradable polyester film, which is made from the following components in parts by weight: PLA: 20 parts, PBAT: 80 parts, diacetyl epoxy vegetable glyceryl oleate: 20 parts, calcium carbonate: 120 parts, antioxidant BHT: 1.0 part; its preparation steps include:

1) drying PLA and PBAT in a vacuum oven at 80° C. for 13 hours; drying calcium carbonate in a vacuum oven at 120° C. for 5 hours;

2) adding PLA, PBAT, diacetyl epoxy vegetable glyceryl oleate, calcium carbonate and antioxidant BHT of the above-mentioned parts by weight to a high-speed mixer, rapidly mixing the same at room temperature at a rotation speed of 240 rpm for 13 mins;

3) adding the raw material mixed evenly in the step 2) to a twin-screw extruder for melt-blending, the operation temperature of the twin-screw extruder in each temperature zone being of 130-180° C., the rotation speed of screw being 210 rpm, then obtaining the plasticized biodegradable polyester material after strip-drawing and grain-slicing;

4) drying the plasticized biodegradable polyester material obtained in step 3) in a vacuum oven at 80° C. for 13 hours;

5) blowing the plasticized biodegradable polyester material obtained after drying in step 4) as a master batch into film through a single-screw extruder, the operating temperature of the film blowing machine in each temperature zone being 130-180° C., the rotation speed of screw being 380 rpm, then obtaining the plasticized biodegradable polyester film sequentially after melting, plasticization, pressurization, cooling, traction and rolling.

Example 10

A plasticized biodegradable polyester film, which is made from the following components in parts by weight: PLA: 30 parts, PBAT: 70 parts, diacetyl epoxy vegetable glyceryl oleate: 20 parts, calcium carbonate: 120 parts, antioxidant 626:1.0 part; its preparation steps include:

1) drying PLA and PBAT in a vacuum oven at 85° C. for 11 hours; drying calcium carbonate in a vacuum oven at 110° C. for 9 hours;

2) adding PLA, PBAT, diacetyl epoxy vegetable glyceryl oleate, calcium carbonate and antioxidant 626 of the above-mentioned parts by weight to a high-speed mixer, rapidly mixing the same at room temperature at a rotation speed of 250 rpm for 10 mins;

3) adding the raw material mixed evenly in the step 2) to a twin-screw extruder for melt-blending, the operation temperature of the twin-screw extruder in each temperature zone being of 130-180° C., the rotation speed of screw being 200 rpm, then obtaining the plasticized biodegradable polyester material after strip-drawing and grain-slicing;

4) drying the plasticized biodegradable polyester material obtained in step 3) in a vacuum oven at 85° C. for 11 hours;

5) blowing the plasticized biodegradable polyester material obtained after drying in step 4) as a master batch into film through a single-screw extruder, the operating temperature of the film blowing machine in each temperature zone being 130-180° C., the rotation speed of screw being 360 rpm, then obtaining the plasticized biodegradable polyester film sequentially after melting, plasticization, pressurization, cooling, traction and rolling.

Comparative Example 1: pure PLA film product without addition of diacetyl epoxy vegetable glyceryl oleate plasticizer, i.e., PLA: 100 parts, antioxidant 1010:0.5 part;

Comparative Example 2: pure PBAT film product without addition of inorganic filler and diacetyl epoxy vegetable glyceryl oleate plasticizer, i.e., PBAT: 100 parts, antioxidant 1076:0.5 part.

The mechanical property of the biodegradable polyester films prepared in Examples 1-10 and Comparative Examples 1-2 were tested, wherein: the thickness of the finished films was measured in accordance with GB/T 6672-2001; the tensile strength and the elongation at break of the finished films were measured in accordance with GB/T 1040-2006; the test data obtained is shown in Table 1.

TABLE 1 comparison of mechanical property
test results of biodegradable polyester film

| Film sample | Tensile strength/MPa | Elongation at break % |
|---|---|---|
| Example 1 | 46.52 | 212.52 |
| Example 2 | 37.22 | 294.31 |
| Example 3 | 16.93 | 205.60 |
| Example 4 | 16.52 | 282.81 |
| Example 5 | 16.34 | 323.44 |
| Example 6 | 17.52 | 547.73 |
| Example 7 | 17.26 | 350.45 |
| Example 8 | 16.10 | 221.23 |
| Example 9 | 17.45 | 782.65 |
| Example 10 | 16.12 | 290.24 |
| Comparative Example 2 | 57.35 | 66.78 |
| Comparative Example 2 | 22.72 | 919.21 |

In Table 1, by comparing Examples 1, 2 with Comparative Example 1, while ensuring that the tensile strength of the PLA film product satisfies daily use requirements (≥16 MPa), along with the increase of content of diacetyl epoxy vegetable glyceryl oleate in the formula, the elongation at break of PLA film products also increases, both of which are ≥200%. The elongation at break of pure PLA film product in Comparative Example 1 is 66.78%; after addition of 20 parts of diacetyl epoxy vegetable glyceryl oleate plasticizer to the formula, the elongation at break thereof has been increased to 294.31% in Example 2, an increase of 340%.

By comparing Examples 3, 4, 5 with Comparative Example 2, the addition of inorganic filler to the PBAT product will reduce the tensile strength and elongation at break of the product, which are respectively reduced from 22.72 MPa and 919.21% in Comparative Example 2 to 16.93 MPa and 205.60% in Example 3. At the same time, however, with the increase of the content of diacetyl epoxy vegetable glyceryl oleate in the formula, under the premise of ensuring that the product has a certain tensile strength (≥16 MPa), the elongation at break thereof can be significantly increased, from 205.60% in Example 3 to 323.44% in Example 5.

By comparing Examples 6, 7, 8 with Comparative Example 2, it can be seen that after addition of 18 parts of diacetyl epoxy vegetable glyceryl oleate plasticizer to the PBAT film product, with the increase of the inorganic filler, that is, from 50 parts in Example 6 to 150 parts in Example 8, the tensile strength of the product is slightly decreased, and at the same time, although the elongation at break decreases from 547.73% in Example 6 to 221.23% in Example 8, it is still ≥200%, which can meet daily use requirements. From the above data, by adding a certain amount of diacetyl epoxy vegetable glyceryl oleate to the PBAT film product, even the inorganic filler is added in a large proportion, the product can still satisfy people's daily needs, so this method can significantly reduce production costs of the PBAT film products and increase their market competitiveness.

By comparing Examples 9, 10 with Comparative Examples 1, 2, it can be seen that in the film made of PLA and PBAT polyester mixed material, diacetyl epoxy vegetable glyceryl oleate can be used both as plasticizer and as compatibilizer that enhances the compatibility of the mixed material; therefore, even 120 parts of inorganic filler are added, the tensile strength and elongation at break of the product can still meet daily requirements.

The present invention has been described in detail by means of preferred embodiments. However, variations and additions to the embodiments are apparent to those of ordinary skill in the art from a review of the foregoing. It is the Applicant's intention that all such variations and additions fall within the protection scope of the claims of the present invention. The terms used herein are only for describing embodiments and are not intended to limit the present invention. Unless otherwise defined, all terms (including technical and scientific terms) used herein have the same meaning as commonly understood by one of ordinary skill in the art to which this invention belongs. Any modification or improvement made to this product, or the substitution or use of substances of similar type or similarity within the scope of the patent, shall all fall within the protection scope of the present invention.

The invention claimed is:

1. A plasticized biodegradable polyester film comprising:
   biodegradable polyester in approximately 100 parts by weight;
   plasticizer in from approximately 5-25 parts by weight;
   inorganic filler in from approximately 50-150 parts by weight; and
   antioxidant in from approximately 0.1-1 parts by weight;
   wherein the biodegradable polyester comprises poly (butylene terephthalate-co-butylene adipate) ester; and
   wherein the plasticizer comprises diacetyl epoxy vegetable glyceryl oleates.

2. The biodegradable polyester film according to claim 1, wherein the biodegradable polyester further comprises polylactic acid that has a weight average molecular weight Mw of from approximately 100,000 to 400,000.

3. The biodegradable polyester film according to claim 1, wherein the inorganic filler comprises at least one filler selected from the group consisting of calcium carbonate, kaolin, talcum powder, titanium dioxide, mica and montmorillonite.

4. The biodegradable polyester film according to claim 1, wherein the antioxidant is selected from the group consisting of pentaerythritol tetrakis [β(3,5-di-tert-butyl-4-hydroxyphenyl) propionate] ester, β(3,5-di-tert-butyl-4-hydroxyphenyl)propionic acid n-octadecyl ester, antioxidant BHT, tris [2.4-di-t-butylphenyl] phosphite, bis(2,4-di-tert-butylphenol) pentaerythritol diphosphite, and triphenyl phosphite.

5. A method for preparing the plasticized biodegradable polyester film according to claim 1 comprising:
   drying the biodegradable polyester;
   drying the inorganic filler;
   mixing the biodegradable polyester, the plasticizer, the inorganic filler and the antioxidant;
   adding the mixed biodegradable polyester, plasticizer, inorganic filler and antioxidant into an extruder forming extruded plasticized biodegradable polyester material;
   drying the extruded plasticized biodegradable polyester material; and
   blowing the dried plasticized biodegradable polyester material as a master batch into film through an extruder to obtain the plasticized biodegradable polyester film.

6. The preparation method according to claim 5, wherein drying the biodegradable polyester comprises drying the biodegradable polyester in a vacuum at from approximately 70-90° C. for from approximately 8-24 hours.

7. The biodegradable polyester film according to claim 1, wherein the poly(butylene terephthalate-co-butylene adipate) ester has a weight average molecular weight Mw of from approximately 50,000 to 80,000.

8. The preparation method according to claim 5, wherein mixing the biodegradable polyester, plasticizer, inorganic filler and antioxidant comprises mixing the biodegradable polyester, plasticizer, inorganic filler and antioxidant at from approximately 200-250 rpm for from approximately 5-15 minutes.

9. The preparation method according to claim 5, wherein adding the mixed biodegradable polyester, plasticizer, inorganic filler and antioxidant into an extruder comprises adding the mixed biodegradable polyester, plasticizer, inorganic filler and antioxidant into a twin-screw extruder.

10. The preparation method according to claim 9 further comprising melt-blending the plasticized biodegradable polyester material via the twin-screw extruder.

11. The preparation method according to claim 9 further comprising strip-drawing and grain-slicing the twin-screw extruded plasticized biodegradable polyester material.

12. The preparation method according to claim 5, wherein drying the extruded plasticized biodegradable polyester material comprises drying the extruded plasticized biodegradable polyester material in a vacuum at from approximately 70-90° C. for from approximately 8-24 hours.

13. The preparation method according to claim 5, wherein blowing the dried plasticized biodegradable polyester material comprises blowing the dried plasticized biodegradable polyester material as a master batch into film through a single-screw extruder.

14. The preparation method according to claim 5, wherein drying the inorganic filler comprises drying the inorganic filler in a vacuum at from approximately 105-125° C. for from approximately 3-12 hours.

15. The biodegradable polyester film according to claim 2, wherein the inorganic filler comprises at least one filler selected from the group consisting of calcium carbonate, kaolin, talcum powder, titanium dioxide, mica and montmorillonite.

16. The biodegradable polyester film according to claim 2, wherein the antioxidant is selected from the group consisting of pentaerythritol tetrakis [β(3,5-di-tert-butyl-4-hydroxyphenyl) propionate] ester, β(3,5-di-tert-butyl-4-hydroxyphenyl)propionic acid n-octadecyl ester, antioxidant BHT, tris[2.4-di-t-butylphenyl] phosphite, bis(2,4-di-tert-butylphenol) pentaerythritol diphosphite, and triphenyl phosphite.

17. The biodegradable polyester film according to claim 2, wherein the poly(butylene terephthalate-co-butylene adipate) ester has a weight average molecular weight Mw of from approximately 50,000 to 80,000.

18. A method for preparing the plasticized biodegradable polyester film according to claim 2 comprising:
drying the biodegradable polyester;
drying the inorganic filler;
mixing the biodegradable polyester, the plasticizer, the inorganic filler and the antioxidant;
adding the mixed biodegradable polyester, plasticizer, inorganic filler and antioxidant into an extruder forming extruded plasticized biodegradable polyester material;
drying the extruded plasticized biodegradable polyester material; and
blowing the dried plasticized biodegradable polyester material as a master batch into film through an extruder to obtain the plasticized biodegradable polyester film.

19. The preparation method according to claim 18, wherein drying the biodegradable polyester comprises drying the biodegradable polyester in a vacuum at from approximately 70-90° C. for from approximately 8-24 hours;
wherein mixing the biodegradable polyester, plasticizer, inorganic filler and antioxidant comprises mixing the biodegradable polyester, plasticizer, inorganic filler and antioxidant at from approximately 200-250 rpm for from approximately 5-15 minutes; and
wherein adding the mixed biodegradable polyester, plasticizer, inorganic filler and antioxidant into an extruder comprises adding the mixed biodegradable polyester, plasticizer, inorganic filler and antioxidant into a twin-screw extruder.

20. The preparation method according to claim 19 further comprising:
melt-blending the plasticized biodegradable polyester material via the twin-screw extruder;
strip-drawing and grain-slicing the twin-screw extruded plasticized biodegradable polyester material.

* * * * *